United States Patent
Chen et al.

(10) Patent No.: US 9,680,512 B2
(45) Date of Patent: Jun. 13, 2017

(54) MESSAGE RETRIEVING SYSTEM WITH SIGNAL COLLISION MITIGATION AND A METHOD THEREOF

(71) Applicant: Hong Kong Applied Science and Technology Research Institute Co. Ltd., New Territories (HK)

(72) Inventors: Jun Chen, New Territories (HK); Song He, New Territories (HK)

(73) Assignee: Hong Kong Applied Science and Technology Research Institute Co. Ltd., Shatin (HK)

(*) Notice: Subject to any disclaimer, the term of this patent is extended or adjusted under 35 U.S.C. 154(b) by 379 days.

(21) Appl. No.: 13/940,238

(22) Filed: Jul. 11, 2013

(65) Prior Publication Data

US 2015/0016572 A1    Jan. 15, 2015

(51) Int. Cl.
| | | |
|---|---|---|
| *H04B 7/02* | (2006.01) | |
| *H04L 1/02* | (2006.01) | |
| *H04B 1/12* | (2006.01) | |
| *H04J 11/00* | (2006.01) | |
| *H04J 13/00* | (2011.01) | |
| *H04W 4/00* | (2009.01) | |
| *H04B 7/10* | (2017.01) | |
| *H04B 1/7093* | (2011.01) | |

(52) U.S. Cl.
CPC ............... *H04B 1/12* (2013.01); *H04J 11/00* (2013.01); *H04J 11/0023* (2013.01); *H04J 13/004* (2013.01); *H04B 1/7093* (2013.01); *H04B 7/10* (2013.01); *H04W 4/008* (2013.01)

(58) Field of Classification Search
None
See application file for complete search history.

(56) References Cited

U.S. PATENT DOCUMENTS

| | | |
|---|---|---|
| 5,519,381 A | 5/1996 | Lenarcik et al. |
| 5,940,006 A | 8/1999 | MacLellan et al. |
| 6,611,224 B1 | 8/2003 | Nysen |
| 6,952,157 B1 | 10/2005 | Stewart et al. |
| 7,667,652 B2 | 2/2010 | Gevargiz |
| 7,782,926 B2 | 8/2010 | Myers |
| 7,873,326 B2 | 1/2011 | Sadr |

(Continued)

OTHER PUBLICATIONS

Christoph Angerer et al., "RFID Reader Receivers for Physical Layer Collision Recovery", IEEE Transactions on Communications, Dec. 2010, pp. 3526-3537, vol. 58, No. 12.

(Continued)

*Primary Examiner* — Wednel Cadeau
(74) *Attorney, Agent, or Firm* — Norton Rose Fulbright US LLP

(57) ABSTRACT

A message retrieving system and method for signal collision mitigation and the method thereof are disclosed. The message retrieving system transmits two orthogonal signals over two isolated antenna during a time period that it expects to receive the response. Two virtual channels are artificially created and the collision of response signals originated from the respondents is mitigated.

15 Claims, 8 Drawing Sheets

(56) References Cited

U.S. PATENT DOCUMENTS

| | | | |
|---|---|---|---|
| 2007/0086509 A1* | 4/2007 | Rjeily | H04B 1/7172 375/130 |
| 2007/0152830 A1* | 7/2007 | Burr | G06K 19/07749 340/572.7 |
| 2007/0222608 A1 | 9/2007 | Maniwa | |
| 2008/0132165 A1 | 6/2008 | Kho | |
| 2008/0273579 A1* | 11/2008 | Rofougaran | H01Q 1/246 375/219 |
| 2009/0219141 A1 | 9/2009 | Pillai et al. | |
| 2009/0252259 A1* | 10/2009 | Ikeda | H04B 1/71637 375/340 |
| 2010/0019883 A1 | 1/2010 | Eom | |
| 2010/0039233 A1 | 2/2010 | Niedzwiecki | |
| 2010/0102933 A1 | 4/2010 | Hsieh et al. | |
| 2010/0262389 A1* | 10/2010 | Nakanishi | G01N 35/025 702/56 |
| 2010/0271179 A1 | 10/2010 | Maltseff | |
| 2011/0148221 A1 | 6/2011 | Trotter | |
| 2012/0098643 A1* | 4/2012 | Gunther | G06K 7/10435 340/10.1 |
| 2012/0139712 A1 | 6/2012 | Jung et al. | |

OTHER PUBLICATIONS

Azhar Hasan et al., "Experimental Demonstration of Transmit Diversity for Passive Backscatter RFID Systems", in proceeding IEEE International Conference on RFID—Technologies and Applications, 2011, pp. 544-548.

Lei Kang et al., "DDC: A Novel Scheme to Directly Decode the Collisions in UHF RFID Systems", IEEE Transactions on Parallel and Distributed Systems, Feb. 2012, pp. 263-270, vol. 23, No. 2.

Dheeraj K. Klair, "A Survey and Tutorial of RFID Anti-Collision Protocols", IEEE Communications Surveys & Tutorials, Third Quarter 2010, pp. 400-421, vol. 12, No. 3.

Hsin-Chin Liu, "The Approaches in Solving Passive RFID Tag Collision Problems", Radio Frequency Identification Fundamentals and Applications Bringing Research to Practice, Ed.), ISBN: 978-953-7619-73-2. published Feb. 1, 2010, pp. 49-56, Chapter 3, Available from: http://www.intechopen.com/books/radio-frequency-identification-fundamentals-and-applications-bringing-research-to-practice/the-approaches-in-solving-passive-rfid-tag-collision-problems.

* cited by examiner

MESSAGE RETRIEVING SYSTEM WITH SIGNAL COLLISION MITIGATION AND A METHOD THEREOF

FIELD OF INVENTION

This invention relates to collision avoidance in a master-slave, command-response type message retrieval system. In particular, it discloses a collision mitigation strategy for a Radio Frequency Identification (RFID) system.

BACKGROUND OF INVENTION

Many communication systems adopt a master-slave, command-response type of protocol whereby a master unit sends a command to one or more slave devices and solicits their responses. When there are more than one slave replies simultaneously, the slave signals arrive at the master unit concurrently so the master receives a corrupted signal and cannot decode the slaves' responses. Even in the slotted-Aloha system where the slaves can randomly choose a time slot out of a finite number of time slots to reply, the probability that two or more slaves choose the same time slot is not small. When signal collision occurs, the master has to poll the slaves again and that will reduce the system throughput.

The Radio Frequency Identification (RFID) system is one such system. The master is the RFID reader and the slaves are the RFID tags. In practice, there can be many tags within the receiving range of a RFID reader so the collision problem is a major issue. There have been many anti-collision schemes developed over the years. Many adopt signal diversification approach such as Code Division Multiple Access (CDMA), Frequency Division Multiple Access (FDMA), Orthogonal Frequency Division Multiple Access (OFDMA) and Spatial Division Multiple Access (SDMA). Yet most of these schemes require rather complex circuitry at the RFID tag to realize them. However, complex circuitry requires more power to operate. For those RFID systems whereby the tags are energized solely by the reader, this means that the read distance will be reduced. More importantly, more circuitry means higher cost to produce the tags. As the overall cost-benefit analysis of an RFID deployment depends heavily on the cost of the tag, all these approaches are not very attractive. Hence, a more cost effective collision avoidance or collision mitigation solution is needed.

SUMMARY OF INVENTION

In the light of the foregoing background, it is an object of the present invention to provide alternative anti-collision approach. In particular, a simple yet reliable message retrieving system and method which mitigates signal collision without increasing respondent's complexity is disclosed.

Accordingly, the present invention, in one aspect, is a message retrieving system for at least one respondent comprising (a) a first antenna configured to transmit a first signal to the respondent and to receive a response signal from the respondent, (b) a second antenna configured to transmit a second signal to the respondent and to receive the response signal from the respondent, (c) a first demodulator coupled to the first antenna and configured to extract a first component from the response signal, (d) a second demodulator coupled to the second antenna and configured to extract a second component from the response signal; and (e) a retrieving module configured to retrieve at least one message of the respondent based on the first component and the second component; wherein the first antenna is substantially isolated with the second antenna; and the first signal is substantially orthogonal to the second signal in time domain.

In one embodiment, the first component is substantially orthogonal to the second component in time domain.

In another embodiment, the message retrieving system further comprising (a) a first waveform generator coupled to the first antenna through a first transmitter; said first waveform generator configured to generate a first time domain waveform; and (2) a second waveform generator coupled to the second antenna through a second transmitter; said second waveform generator configured to generate a second time domain waveform; wherein the first time domain waveform is orthogonal to the second time domain waveform; the first signal comprises a carrier signal modulated by the first time domain waveform; and the second signal comprises the carrier signal modulated by the second time domain waveform.

In yet another embodiment, the first time domain waveform is a first modified Hermite pulse; and the second time domain waveform is a second modified Hermite pulse.

In one embodiment, the first antenna and the second antenna are isolated by their different polarization. In another embodiment, the first antenna and the second antenna are spatially isolated. In another embodiment, the first antenna and the second antenna are isolated by radiation pattern.

According to another aspect of the present invention is a method of retrieving message of at least one respondent. The method comprises the steps of (a) transmitting a first signal and a second signal to the respondent substantially simultaneously using a first antenna and a second antenna respectively, (b) receiving a response signal from the respondent using the first antenna and the second antenna, (c) extracting a first component from the response signal received from the first antenna, (d) extracting a second component from the response signal received from the second antenna, and (e) retrieving the message of the respondent based on the first component and second component, wherein the first antenna is substantially isolated with the second antenna and the first signal is substantially orthogonal to the second signal in time domain.

In one embodiment, the first component is substantially orthogonal to the second component in time domain.

In another embodiment, the method further comprises the steps of (a) generating the first signal by modulating a carrier signal by a first time domain waveform, and (b) generating the second signal by modulating the carrier signal by a second time domain waveform, wherein the first time domain waveform is orthogonal to the second time domain waveform.

In yet another embodiment, the method further comprises the steps of (a) extracting a first filtered signal from the first component and extracting a second filtered signal from the second component.

According to yet another aspect of the present invention is a method of decoding signals from at least one respondent comprising the steps of (a) generating at least two time domain waveforms where the time domain waveforms are orthogonal to one another, (b) modulating a carrier frequency by the at least two time domain waveforms to obtain at least two signals, (c) transmitting the at least two signals by at least two antennas to at least one respondent where the at least two antennas are isolated from one another, (d) receiving response signal, the response signal originating from the at least one respondent when the at least one respondent receives the at least two signals, (e) coupling the response signal to at least two matched filter units to obtain at least two filtered signals, and (f) decoding at least one message from at least two filtered signals with each the at least one message embedded in the response signal.

There are many advantages to the present invention. In particular, the present invention provides a system and a method to mitigate signal/message collision without increasing respondent's complexity. Such design reduces both the complexity and the cost of the system. Another advantage of the present invention is that the message retrieving speed from a pool of respondents can be substantially increased due to the reduction of the signal/message collision.

DETAILED DESCRIPTION OF THE PREFERRED EMBODIMENTS

As used herein and in the claims, "comprising" means including the following elements but not excluding others.

Figure 1:
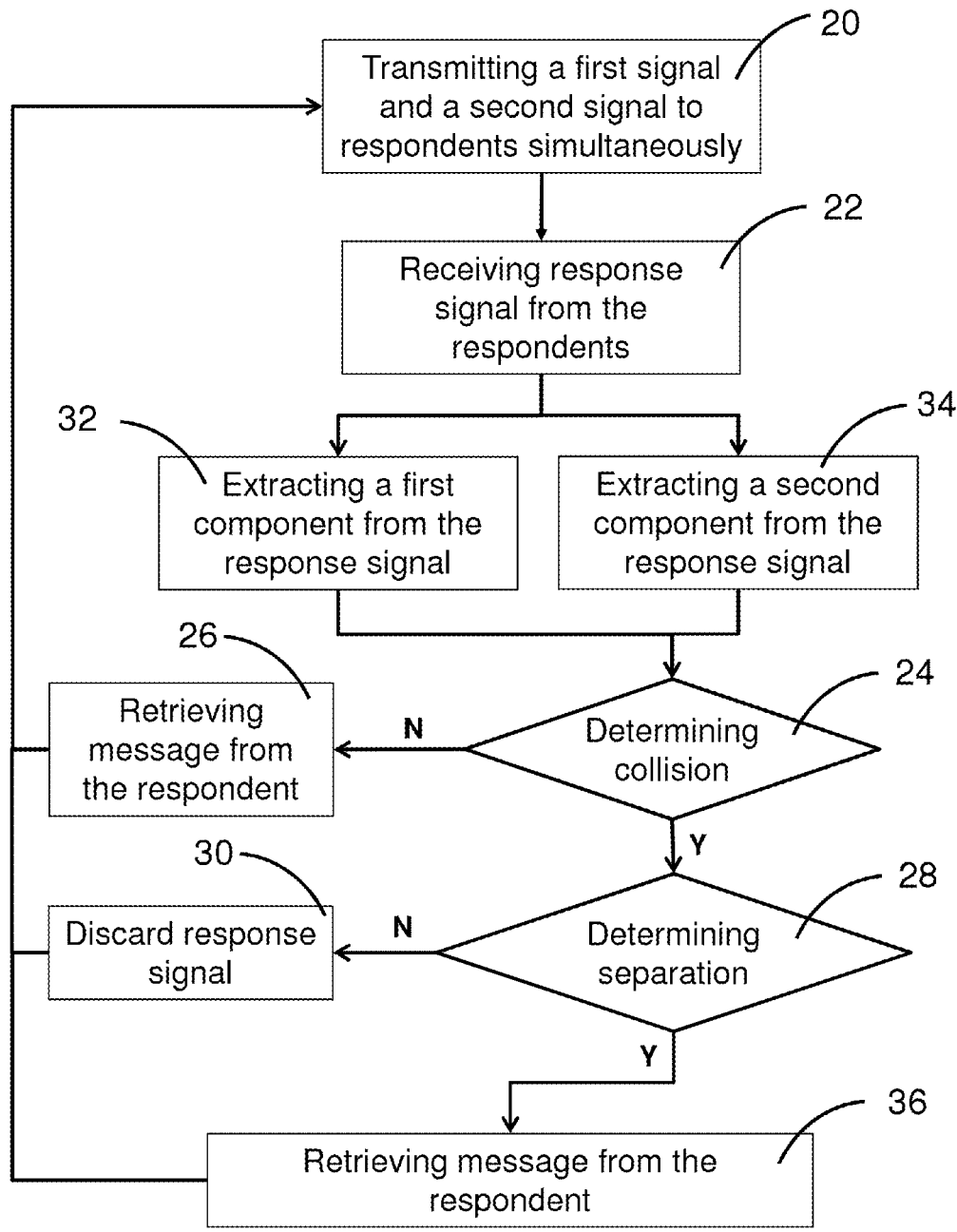
FIG. 1 is a flow chart of a method of retrieving message of at least one respondent according to one embodiment of the present invention.

The present invention as shown in FIG. 1, in one aspect, provides a method of retrieving message of at least one respondent. In step 20, a first signal and a second signal are transmitted to the respondents substantially simultaneously via a first antenna and a second antenna respectively. Next, the response signal from the respondents is received by the two antennas in step 22 for subsequence extraction. A first component is extracted from the response signal received by the first antenna in step 32 and a second component is extracted from the response signal received by the second signal in step 34. The first component and the second component are utilized to determine whether there exists any signal collision in step 24. If there is no collision, the component is decoded and the message of the respondent is retrieved in step 26. On the other hand, if there is signal collision, the two components are further analyzed to check if they are separable in step 28. If separation is not possible in step 28, the components are discarded in step 30 and the first signal and second signal will be re-send. Otherwise, they are decoded and the message of the respondent is retrieved in step 36.

To further illustrate the present invention, a RFID system is used as an exemplary embodiment to elaborate on the method of retrieving message. In one embodiment, a RFID reader comprising two antenna is adopted and the respondents are the RFID tags. In the following paragraphs, we will use reader to denote RFID reader and tags to denote RFID tags. In another embodiment, the message to be retrieved is the unique identity (ID) code embedded in the RFID tags.

Figure 2A:
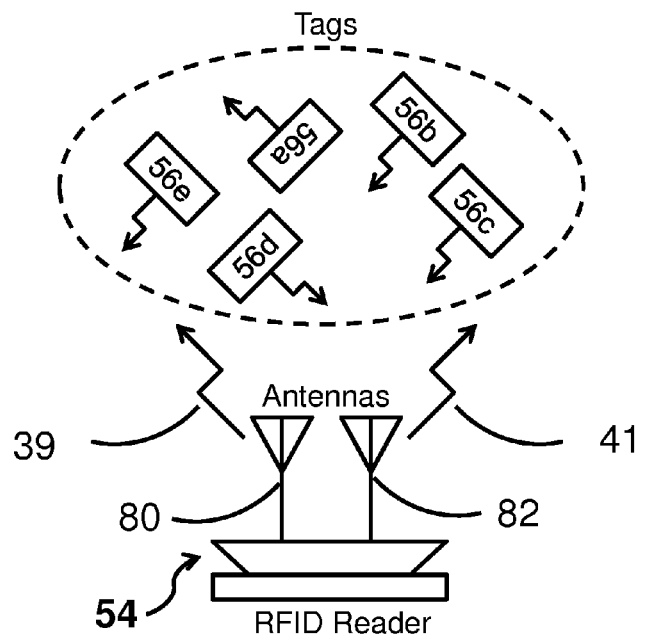
FIG. 2a shows an exemplary operational environment of the message retrieving system according to one embodiment of the present invention.

FIG. 2a illustrates an exemplary operating environment comprising a reader 54 and a plurality of tags 56 in its read field according to one embodiment of the present invention. The reader 54 comprises two polarized antennas 80 and 82. In one embodiment, the first antenna 80 is polarized at a first polarization angle 39 and the second antenna 82 is polarized at a second polarization angle 41 that is substantially orthogonal to the first polarization angle 39. The arrows of labels 39 and 41 indicate the polarization orientation of the corresponding antenna respectively. Each tag 56 also has an antenna to receive the signal from the reader 54. The antenna orientations of these tags are random and are represented by the arrow associated. For those tag antennas that substantially align with the polarization angles of the first or the second antennas of the reader 54, the corresponding tag 56 will pick up a stronger signal from the respective antennas. Hence, for tag 56a, its antenna aligns with the first polarization angle 39 of the first antenna 80, so it picks up a strong signal from the first antenna. However, it will pick up a weak signal from the second antenna 82 since its antenna orientation is substantially orthogonal to the second polarization angle 41 of the second antenna 82. Likewise, tags 56b, 56c and 56e receives strong signal from the second antenna 82 but not from the first antenna 80. For tag 56d, even though its antenna orientation is substantially oppose the first polarization angle 39 of the first antenna 80, it can pick up a strong signal from the first antenna 80 but not the second antenna 82.

Figure 2B:
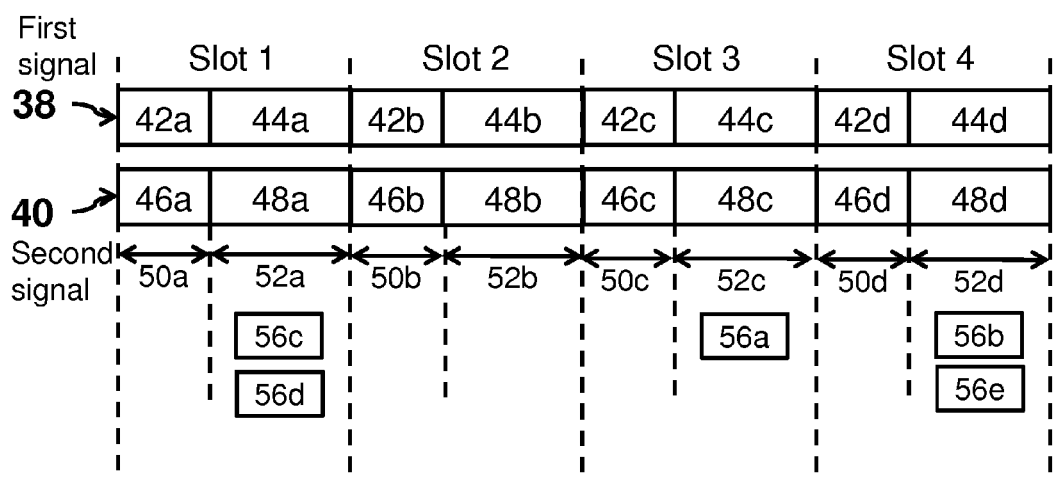
FIG. 2b shows a framed dynamic slotted ALOHA algorithm for the system according to one embodiment of the present invention.

In operation, the reader 54 adopts dynamic slotted ALOHA algorithm as shown in FIG. 2b to send out two signals (radio frequency waves) via the first antenna and the second antenna. The algorithm regulates the slot size with forward link period 50 and backward link period 52 to transmit a first signal 38 via the first antenna 80 and a second signal 40 via a second antenna 82. The first signal 38 comprises first command signal 42 and first Orthogonal Waveform Modulated Carrier (OWMC) signal 44. The second signal 40 comprises second command signal 46 and second OWMC signal 48. In one embodiment, the first command signal 42 and the second command signal 46 are the same. The first OWMC signal 44 and second OWMC signal 48 are substantially orthogonal to each other. During the forward link period 50, the reader 54 (as shown in FIG. 2a) sends out first command signal 42 and second command signal 46 using first antenna 80 and second antenna 82 respectively. During the backward link period 52, the reader substantially simultaneously transmits first OWMC signal 44 and second OWMC signal 48 via the two antennas 80 and 82 respectively to energize and activate the tags 56a-e and simultaneously receives response signals from them. When a tag 56 receives a command signal from the reader 54, it will reflect back or backscattered a response signal embedded with a message to the reader 54. In the dynamic slotted ALOHA algorithm, each tag 56 randomly selects a time slot to send back its response signal. As such, some of the tags may choose the same time slot to reply and hence signal collision occurs. As illustrated in FIG. 2b, both tag 56c and tag 56d responds in slot 1. At the first antenna 80, it receives a strong signal from tag 56d and a weak signal from tag 56c due to the antenna orientation of these two tags relative to the first polarization angle 39 of the first antenna 80. Likewise, the second antenna 82 receives a strong signal from tag 56c and a weak signal from tag 56d. Furthermore, the first antenna 80 transmits a first OWMC signal 44a during the back link period 52a while the second antenna 82 transmits a second OWMC signal 48a during the back link period 52a. So the response signal received by the first antenna 80 comprises (1) a strong signal with the first OWMC signal 44a from tag 56d, (2) a weak signal with the second OWMC signal 48a from tag 56c, (3) an even weaker signal with first OWMC signal 44a from tag 56c and (4) another weak signal with second OWMC signal 48a from tag 56d. Based on signal strength analysis (described later), a first receiver (not shown) coupled to the first antenna 80 is able decode the message sent by tag 56d. In a similar fashion, a second receiver (not shown) coupled to the second antenna 82 can decode the message sent by tag 56c. Hence even tag collision occurs in this time slot, it can be resolved and mitigated. In slot 2, the reader 52 senses no response as there is no tag sending response signal in this slot. The reader 52 can identify tag 56a in slot 3 as there is only one tag response in this slot. In Slot 4, tag 56b and tag 56e transmit their response signals substantially simultaneously back to the reader 52. Since the antennas of tag 56b and tag 56e have substantially the same orientation, the reflected signals collide with each other and their response signal cannot be separated. As a result, their messages cannot be retrieved.

Figure 3:
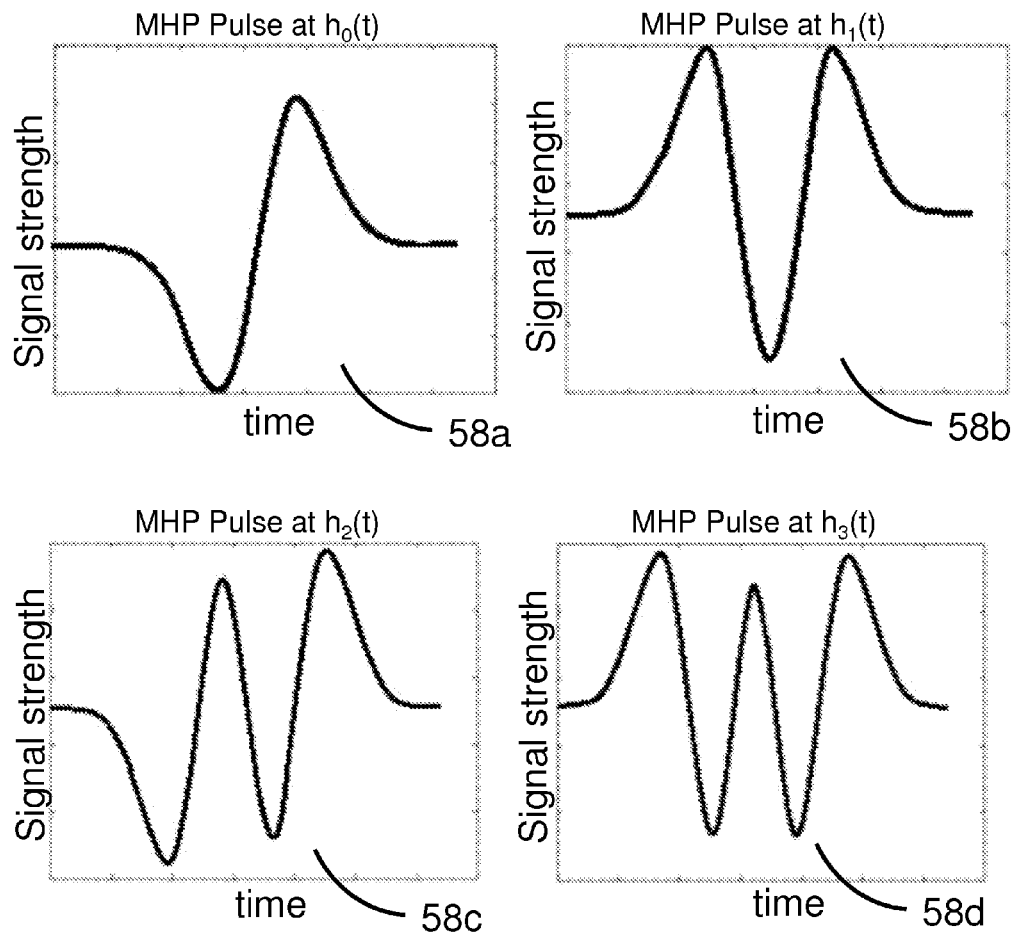
FIG. 3 shows a set of orthogonal modified Hermite polynomial pulses according to one embodiment of the present invention.

In one embodiment, the first OWMC signal 44 and the second OWMC signal 46 are continuous carrier signal modulated by orthogonal Modified Hermite Polynomial (MHP) pulses. FIG. 3 shows a set of orthogonal Modified Hermite Polynomial (MHP) pulses with almost invariant pulse width generated from modified Hermite polynomial functions as shown in equation (1):

$$h_n(t) = e^{-\frac{t^2}{4}} h_{en}(t) = (-1)^n e^{\frac{t^2}{4}} \frac{d^n}{dt^n}\left(e^{-\frac{t^2}{2}}\right) \quad (1)$$

where $h_{en}(t)$ are Hermite polynomials. In FIG. 3, the MHP pulses 58a, 58b, 58c and 58d corresponds to $h_0(t)$, $h_1(t)$, $h_2(t)$, and $h_3(t)$ respectively.

Figure 4:
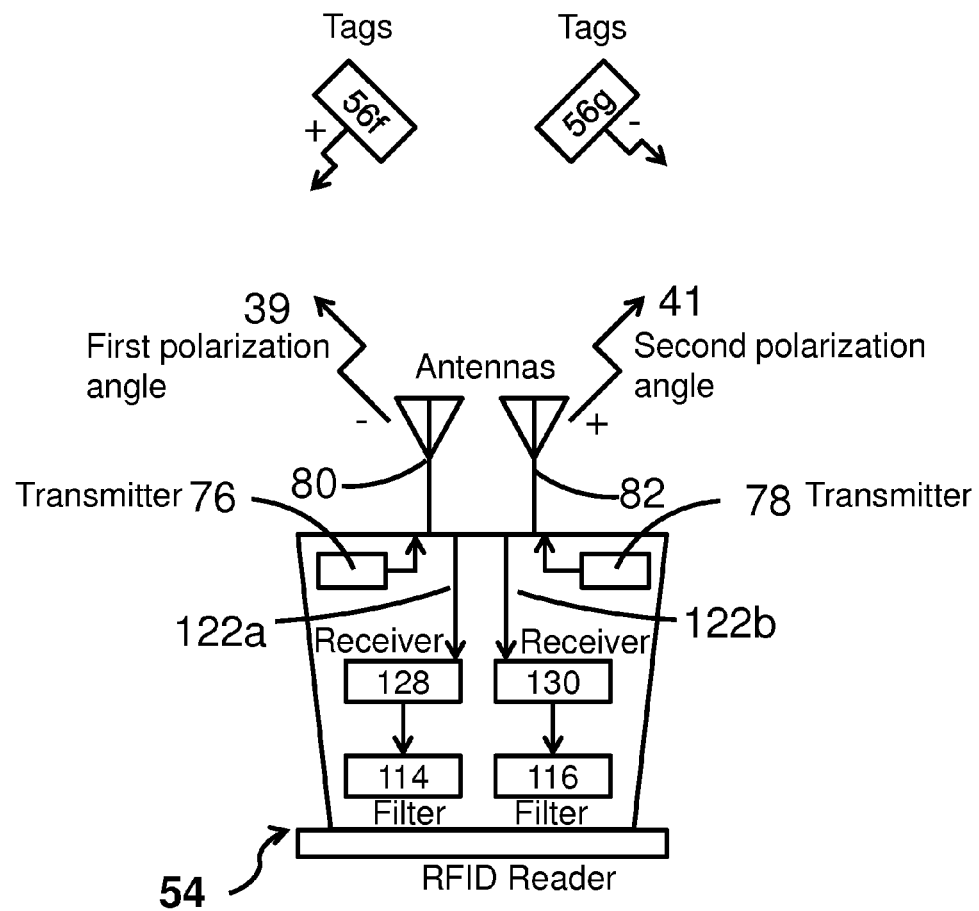
FIG. 4 shows a simplified message retrieving system according to another embodiment of the present invention.

As mentioned previously, the response signal at the input of any of the receiver comprises a plurality of reflected signals, one from each RFID tag. To illustrate how the signal strength analysis is performed to retrieve the message, a simplified operation environment as shown in FIG. 4 is used. In this embodiment, there are two tags 56f and 56g and one reader 54. The first polarization angle 39 of the first antenna 80 is substantially orthogonal to the second polarization angle 41 of the second antenna 82 so that the two antennas are effectively isolated. Moreover, antenna orientation the tag 56f substantially aligns with the second polarization angle 41 while that of the RFID tag 56g substantially aligns with the first polarization angle 39. A first transmitter 76 coupled to the first antenna 80 sends out a first OWMC signal 44 during the backward link period 52 while a second transmitter 78 coupled to the second antenna 82 sends out a second OWMC signal 48 during the same period. In one embodiment, the first OWMC signal 44 is generated by a first MHP pulse while the second OWMC signal 48 is generated by a second MHP pulse that is orthogonal to the first MHP pulse. Both tags 56f and 56g send back their reflected signals to both of the antennas so both antennas receive four reflected signals as discussed previously. The aggregated signals received by the first antenna 80 is referred as the first response signal 122a while that received by the second antenna 82 is referred as the second response signal 122b. The first receiver 128 converts the first response signal 122a to a baseband signal $R_1$. Similarly, the second receiver 130 converts the second response signal 122b to a baseband signal $R_2$. $R_1$ and $R_2$ can be expressed as:

$$R_1 = X \cdot \rho_{1A1} \cdot D_A + X \cdot \rho_{1B1} \cdot D_B + Y \cdot \rho_{2A1} \cdot D_A + Y \cdot \rho_{2B1} \cdot D_B \quad (2)$$

$$R_2 = Y \cdot \rho_{2B2} \cdot D_B + Y \cdot \rho_{2A2} \cdot D_A + X \cdot \rho_{1B2} \cdot D_B + X \cdot \rho_{1A2} \cdot D_A \quad (3)$$

where X and Y are the first and second OWMC signal transmitted over the two isolated antennas 80 and 82 respectively; $\rho_{mXn}$ is the reflective strength originated from antenna m to tag X and reflected back to antenna n; $D_X$ is the message stored in the tag X; m and n are either 1 or 2 (corresponding to antennas 80 and 82 respectively) and X is either A or B (corresponding to tags 56g and 56f respectively) in this illustration.

The baseband signal $R_1$ and $R_2$ are fed to the inputs of the matched filter unit 114 and 116 respectively. The first matched filter unit 114 is configured to yield maximum signal strength output when its input is the first MHP pulse used in the first OWMC signal 44. Likewise, the second matched filter unit 116 is configured to yield maximum signal strength output when its input is the second MHP pulse used in the second OWMC signal 48. As such, the first matched filter unit 114 filters out the last two terms of equation 2 so the output of the first matched filter unit 114, denoted as $MF_X(R_1)$ becomes $$MF_X(R_1) = \rho_{1A1} \cdot D_A + \rho_{1B1} \cdot D_B \quad (4)$$

Due to antenna isolation the reflective strength $\rho_{1A1}$ is higher than $\rho_{1B1}$. In our illustration, we have $\rho_{1A1} \approx 1$, but $\rho_{1B1} \approx 0$ so $$MF_X(R_1) = D_A \quad (5)$$

Hence $D_A$, the message data stored in tag 56g can be retrieved from the output of the first match filter unit 114.

In a similar fashion, the second message $D_B$ can be retrieved at the output of the second match filter unit 116.

Figure 5:
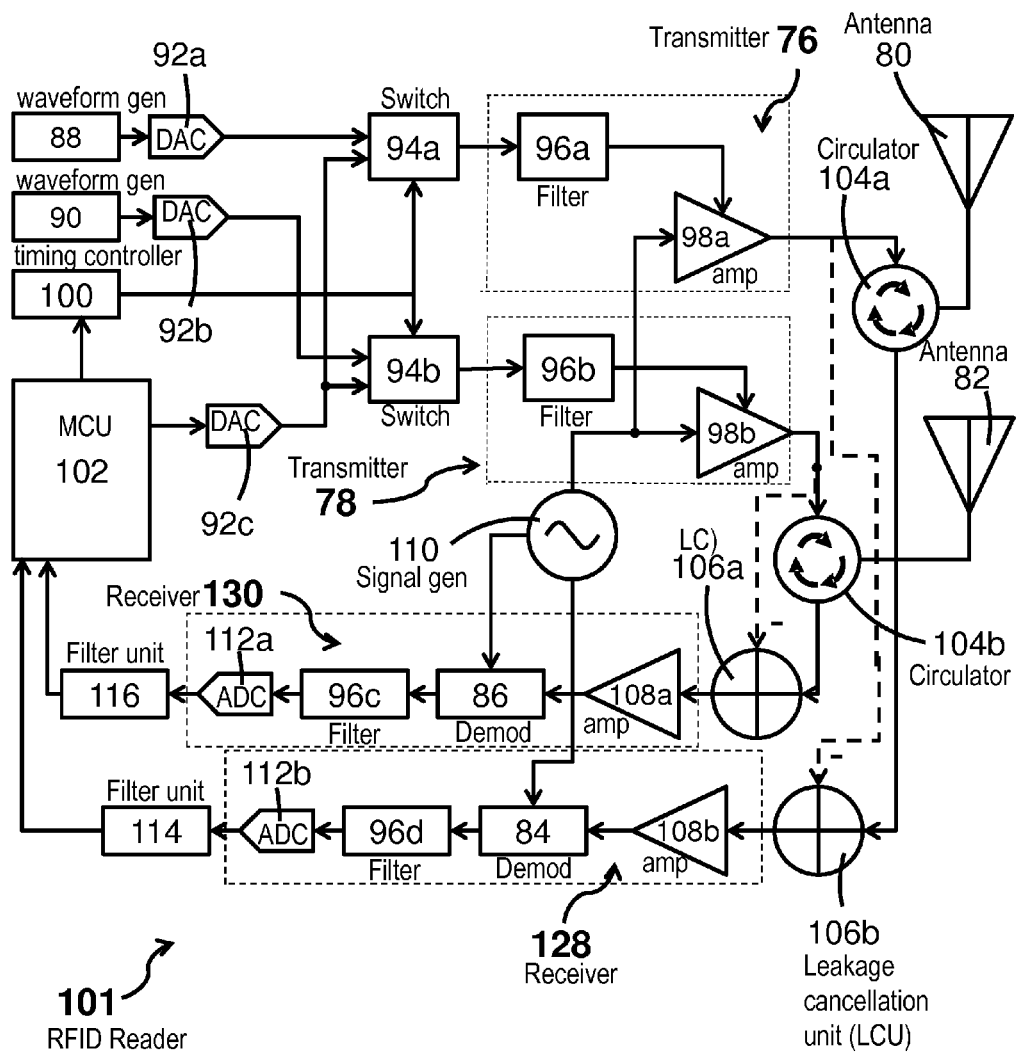
FIG. 5 is a detailed schematic diagram of the message retrieving system according to one embodiment of the present invention.

An exemplary implementation of the message retrieving system (RFID reader) according to one of the embodiment of the present invention is shown in FIG. 5. The RFID reader 101 comprises a microprocessor central processing unit (MCU) 102. The MCU 102 further comprises a memory (not shown) which stores executable program and data. In one embodiment, the MCU 102 is configured to monitor and control the entire operation of the message retrieving system. In operation, the MCU 102 first generates forward link signal and backward link timing signal to the timing controller 100. The timing controller 100 in turn controls the switches 94a and 94b. During the forward link operation, the MCU 102 generates a digital command signal which is then converted to analog signal by a digital-to-analogue convertor (DAC) 92c. The timing controller 100 allows the analog signal to pass through switches 94a and 94b, so that this command signal enters a first transmitter 76 and a second transmitter 78. Each transmitter further comprises a low pass filter 96 and a power amplifier 98. At the power amplifier 98, the carrier frequency generated by a signal generator 110 is amplified and also modulated by the incoming signal. The modulated signal then passes through circulators 104 to reach the respective antenna (80 or 82) so that the modulated signal will then be radiated out via the respective antenna (80 or 82). In one embodiment, the first antenna 80 and the second antenna 82 are isolated with each other.

During the backward link period, the MCU 102 activates the first waveform generator 88 and the second waveform generator 90 to generate a first digital pattern and a second digital pattern respectively. These two digital patterns are then converted to a first time domain waveform and a second time domain waveform by the respective DAC convertors 92*a* and 92*b*. In one embodiment, these two time-domain waveforms are orthogonal to each other. Meanwhile, the timing controller 100 commands the switches 94*a* and 94*b* to connect these two orthogonal time domain waveforms to the inputs of their respective transmitters 76 and 78. As a result, two Orthogonal Waveform Modulated Carriers (OWMC) signal are generated. After they pass through the respective circulator 104*a* and 104*b*, these two OWMC waves are radiated out by the first antenna 80 and the second antenna 82 respectively.

When one or more tags receive the command signal radiated by the RFID reader 101 during the forward link period, they will send a reflected signal back to the RFID reader 101 during the backward link period. In one embodiment, the RFID tags are passive tags and the OWMC signals during the backward link period is to provide the necessary power for the passive tags to send a reflected signal back. When the reflected signal reaches the first antenna 80, it goes through circulator 104*a* and reaches the input of a first receiver 128. This signal is referred as the first response signal Likewise, the reflected signal also enters a second antenna 82, goes through circulator 104*b* to become a second response signal and reaches the input of a second receiver 130. In one embodiment, each receiver comprises a low-noise amplifier (108*a* or 108*b*), a demodulator (84 or 86), a low pass filter (96*c* or 96*d*) and an Analog to Digital Convertor (ADC) (112*a* or 112*b*). In one embodiment, the demodulator (84 or 86) is a I/Q demodulation block. In a further embodiment, the demodulator is configured to receive the carrier frequency signal from the signal generator 110 thereby converting the OWMC signal to a baseband signal. The output of the first receiver 128 is a first component which is fed to a first matched filter unit 114; and the output of the second receiver 130 is a second component that is fed to a second matched filter unit 116.

Since the reflected signal is much weaker than the transmitted signal, certain amount of the transmitted signal may leak to the inputs of the receivers 128 or 130. Hence, leakage cancellation is adopted in one embodiment of the present invention. A copy of the transmitted signal (from the output of the transmitter 76 or 78) is subtracted from the response signal at the leakage cancellation unit (106*a* or 106*b*) before the response signal is fed to the respective receiver (128 or 130).

In one embodiment, the message reflected by the RFID tags is a string of digital symbols. In a further embodiment, these digital symbols are expressed as '1' or '0'. The first time domain waveform and the second time domain waveform are selected from one of the modified Hermite pulses to guarantee that they are orthogonal. The duration of these pulses matches the duration of the digital symbols. In a further embodiment, the first matched filter unit 114 is configured to match the frequency response of the first time domain waveform so that its output amplitude is highest at the end of the symbol duration when the first time domain waveform is received. Likewise, the second matched filter unit 116 is configured to match the frequency response of the second time domain waveform so that its output amplitude is highest at the end of the symbol duration when the second time domain waveform is received.

The output of the first matched filter unit 114 is referred as a first filtered signal while the output of the second match filter 116 is referred as the second filtered signal. Both of the first filtered signal and the second filtered signal are sent to a retrieving module (not shown) within the MCU 102. In one embodiment, the retrieving module converts each of the filtered signals into the ID of a RFID tag. The decoded ID is used by the RFID reader to send another command to this ID so as to access the content of the corresponding RFID tag. If the reader receives the tag content in correct format, this ID is a valid ID. In another embodiment, when the tag message comprises a checksum value, the retrieving module converts each of the filtered signals into a message first. If the message passes the checksum test, then it is accepted as a valid decoded message. In a third embodiment, the retrieving module compares the signal strength of the first filtered signal against that of the second filtered signal and selects the one with the higher strength as output (hereafter referred as third filtered signal). The third filtered signal is decoded to become a digital symbol. After the entire string of digital symbols is decoded, the message from the tag is obtained. If the message comprises a checksum, then the checksum is used to validate the message as discussed before. In yet another embodiment, each of the filtered signals is compared against a pre-defined threshold first. If the signal strength of the filtered signal is higher than the pre-defined threshold, the retrieving module proceeds to perform any of the previous three embodiments of retrieving message of the tag. The aforementioned embodiments disclose some of the approaches to convert the filtered signals into messages. These approaches may be combined in various ways in actual implementations by those skilled in the art.

Figure 6:
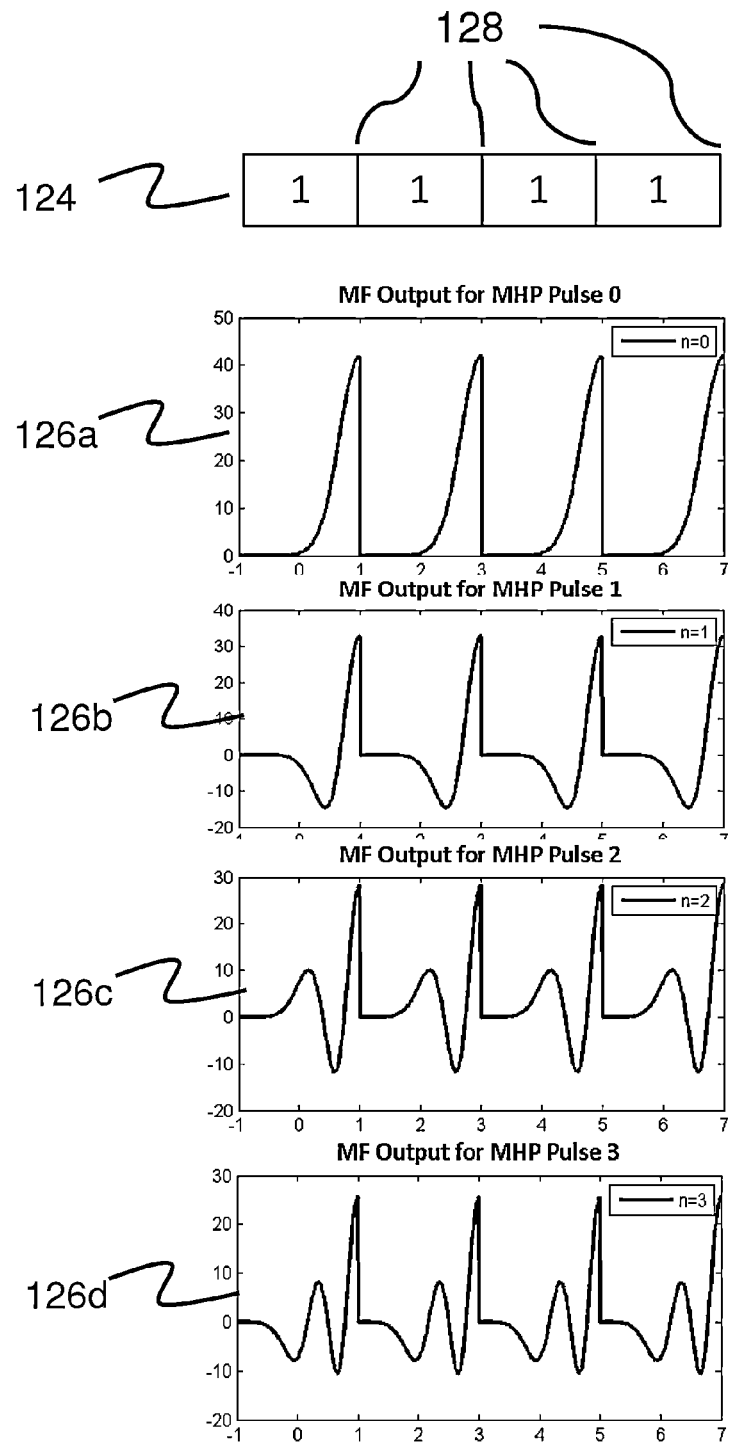
FIG. 6 shows the output responses of the matched filter according to one embodiment of the present invention when the inputs are the orthogonal modified Hermite polynomial pulses as shown in FIG. 3.

The response of both the first matched filter unit 114 and the second matched filter unit 116 is further illustrated in FIG. 6. In one embodiment, a symbol string 124 representing '1111' is used to create two OWMC signals which eventually reflect back to the two receivers 128 and 130 of the RFID reader 101 as mentioned previously. When the inputs to the matched filter unit are MHPs 58*a*, 58*b* 58*c* and 58*d*, the corresponding filtered signals are shown as 126*a*, 126*b*, 126*c*, and 126*d*. It can be seen from FIG. 6 that the output filtered signal is strongest at the symbol boundaries 128. The matched filter unit output at this time is taken as the signal strength of the filtered signal. Thereafter, the matched filter units 114 and 116 are reset to cater for the next symbol.

Figure 7A:
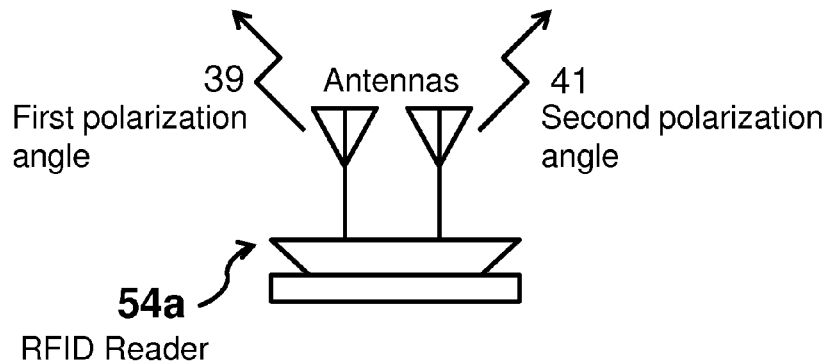
FIGS. 7a-7c are the schematic diagrams of the antennas according to different embodiments of the present invention; wherein the antennas in FIG. 7a are isolated by polarization; the antennas in FIG. 7b are isolated spatially; and the antennas in FIG. 7c are isolated by different active coverage of radiation.
Figure 7B:
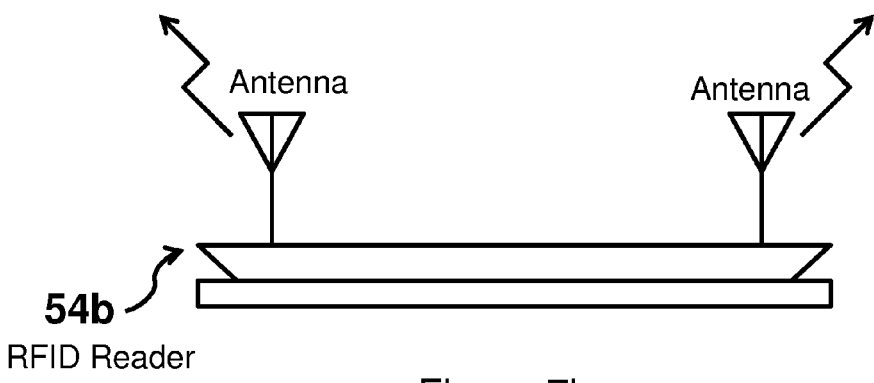
Figure 7C:
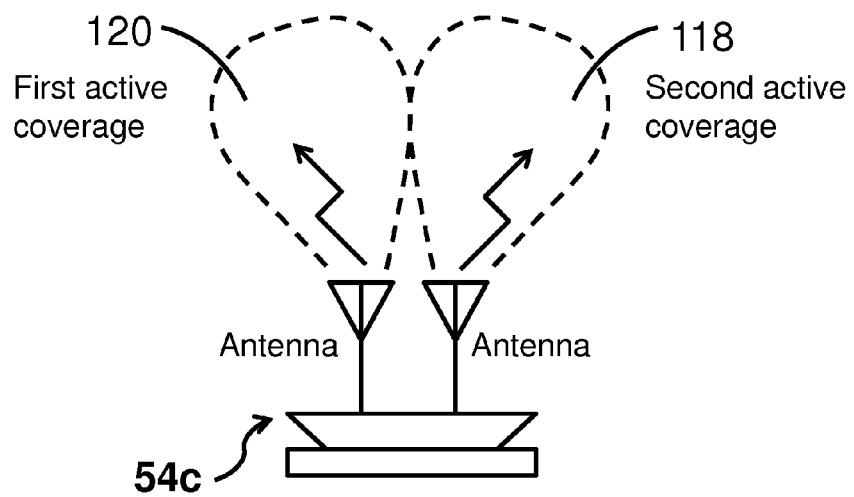

In one embodiment, the first antenna 80 and the second antenna 82 are isolated by their different polarization as shown in FIG. 7*a*. In a further embodiment, the first polarization angle 39 is −45 degree and the second polarization angle 41 is +45 degree so they are orthogonal to each other. In yet another embodiment, the first polarization angle 39 is 0 degree while the second polarization angle 41 is 90 degree. Those skilled in the art would appreciate that other value pairs can be used as long as their difference is 90 degree. In another embodiment, the first antenna 80 and the second antenna 82 are spatially isolated as shown in FIG. 7*b*. In another embodiment, the first antenna 80 and the second antenna 82 are isolated by radiation isolation as shown in FIG. 7*c*, wherein the first active coverage 120 of the first antenna 80 has very little overlap with the second active coverage 118 of the second antenna 82.

Theoretically, every tag sees two orthogonal waveforms and backscatters both of them to the reader. However, the polarization of the antenna and the matched filter unit for orthogonal waveform artificially creates two independent channels. From the RFID reader's viewpoint, the tag is randomly selecting one of the two channels to respond, hence it helps to reduce the probability of tag collision. For a system with K slots and N tags, the probability that in any given slot there is exactly r tags responding simultaneously is given by equation (6):

$$P(r) = \binom{N}{r}\left(\frac{1}{K}\right)^r\left(1-\frac{1}{K}\right)^{N-r} \quad (6)$$

For a slot that is empty or occupied by only one tag, there is no improvement to the system throughput. For a slot occupied by two tags, there is ½ chance that two tags are in different channel. For a slot occupied by three tags, there is ⅝ chance that one tag is in one channel while the other two tags are in the alternative channel and there is ⅜ chance that the single tag in one channel has the strongest signal strength. For a slot occupied by four tags, there is 9/16 chance that one tag is in one channel while the other three tags are in the alternative channel and there is 2/16 chance that the single tag in one channel has the strongest signal strength. For five tag collided slot, there is 10/32 chance to single out one tag and 2/32 chance that the singled-out tag has the strongest signal strength. Since the probability of higher number of tag collision in one slot is low, such situation can be ignored.

Based on the aforementioned analysis, the minimum improved detection probability $P_{min\_imp}$ and maximum improved detection probability $P_{max\_imp}$ resulted from the present invention are given by:

$$P_{min\_imp} = P(1) + \frac{1}{2}*P(2) + \frac{2}{8}*P(3) + \frac{2}{16}*P(4) + \frac{2}{32}*P(5) \quad (7)$$

$$P_{max\_imp} = P(1) + \frac{1}{2}*P(2) + \frac{6}{8}*P(3) + \frac{8}{16}*P(4) + \frac{10}{32}*P(5) \quad (8)$$

For a system of 128 tags and different number of slots (256, 128, 64 and 32), the probability P that a slot is occupied by at most five tags are calculated as in the following table. The calculation result of $P_{min\_imp}$ and $P_{max\_impv}$ are also presented. Based on the table, the best improvement is found when a slot is occupied by at most two tags.

|  | K = 256 N = 128 | K = 128 N = 128 | K = 64 N = 128 | K = 32 N = 128 |
| --- | --- | --- | --- | --- |
| P(0), empty slot | 0.6059 | 0.3664 | 0.1332 | 0.0172 |
| P(1), read slot | 0.3042 | 0.3893 | 0.2707 | 0.0709 |
| P(2), 2 tag collision | 0.0757 | 0.1847 | 0.2728 | 0.1453 |
| P(3), 3 tag collision | 0.0125 | 0.0611 | 0.1819 | 0.1969 |
| P(4), 4 tag collision | 0.0015 | 0.0150 | 0.0902 | 0.1985 |
| P(5), 5 tag collision | 1.49e−4 | 0.0029 | 0.0355 | 0.1588 |
| P = Sum(P(0) + . . . + P(5)) | 1.0000 | 0.9995 | 0.9843 | 0.7876 |
| $P_{min\_imp}$ | 0.3453 | 0.4790 | 0.4660 | 0.2276 |
| $P_{max\_imp}$ | 0.3522 | 0.5159 | 0.5997 | 0.4402 |

Figure 8:
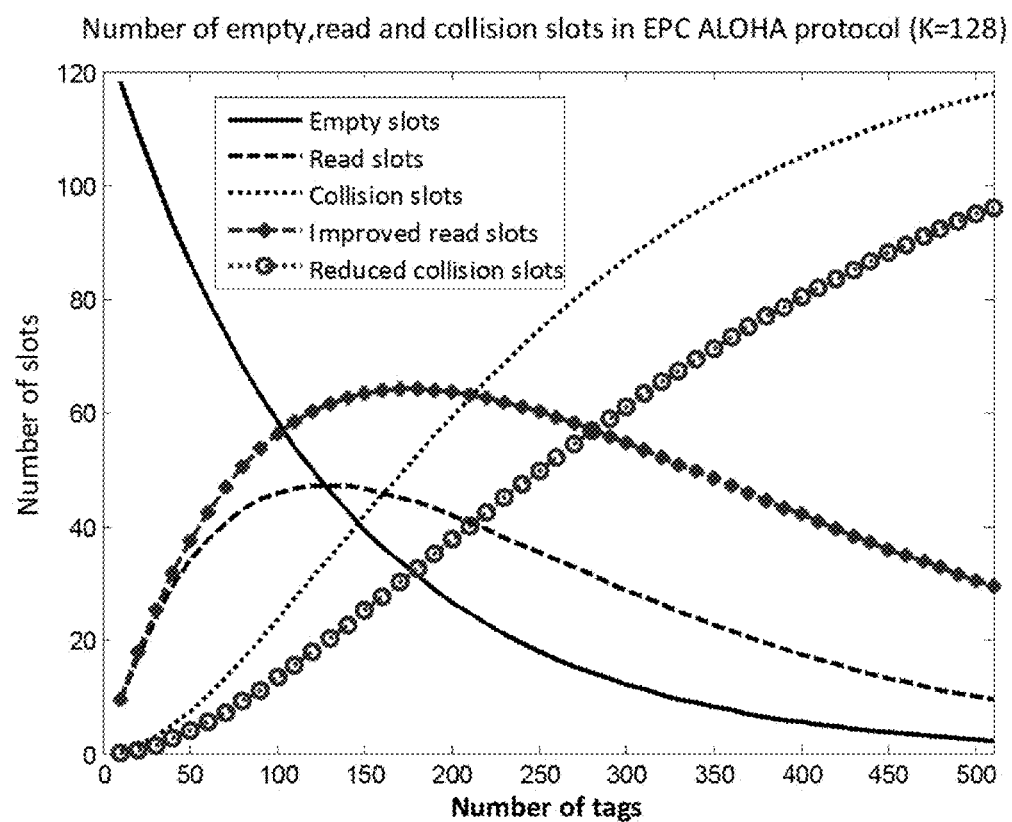
FIG. 8 is a graph illustrating the number of empty slots, read slots, collision slots, improved read slots and reduced collision slots versus the number of tags in Aloha protocol.

FIG. 8 shows the number of empty slot, read slot, collision slot, the improved read slot and reduced collision slot versus the number of tags in electronic product code (EPC) ALOHA protocol with total 128 slots. The empty slot is a slot that no tag presents. The read slot is a slot that the tag can be identified while the improved read slot is a slot that the tag can be identified using the collision mitigation approach disclosed in the present invention. The collision slot is a slot that tag collision occurs while the reduced collision slot is a slot that tag collision occurs using the collision mitigation approach disclosed in the present invention. It can be seen from this figure that for the case of 150 tags, the number of read slot has increased from 45 to 65 using the collision mitigation approach disclosed in the present invention.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, it is mentioned that the orthogonal time domain waveforms can be generated by a modified Hermite polynomial of different orders, it is clear that other methods of creating orthogonal time domain waveforms can also be used, such as Meyer wavelet-based combined waveform. Moreover, strict orthogonality is not necessary required. In actual engineering implementation, many factors, such as various kinds of system noises, component variations, etc. may cause the generated waveforms deviate from the ideal ones. Although this may affect the system performance, the degradation may not be significant if the waveforms are substantially orthogonal to one another.

Likewise, as long as the antennas are substantially isolated from each other, the system and method disclosed here can still mitigate the RFID tag collision problem.

While two orthogonal signals and two isolated antennas are used in the extemporary embodiments to illustrate this invention, those skilled in the art would appreciate that the system and method disclosed here can be extended to more than two orthogonal signals and more than two antennas—as long as the signals are mutually orthogonal and the antennas are mutually isolated.

What is claimed is:

1. A method for isolating response signals from colliding response signals of multiple radio frequency identification (RFID) tags by a RFID reader, the method comprising:
    transmitting, from the RFID reader to the multiple RFID tags, a first waveform from a first antenna of the RFID reader;
    transmitting, from the RFID reader to the multiple RFID tags simultaneously with transmitting the first waveform, a second waveform from a second antenna of the RFID reader, wherein the first waveform is orthogonal to the second waveform, and wherein the first antenna is orthogonal to the second antenna;
    receiving, at the first antenna of the RFID reader while the RFID reader is transmitting the first waveform, response signals that collide at a time slot from two or more RFID tags of the multiple RFID tags, the multiple signals received at the first antenna including a signal from a first RFID tag responsive to the first waveform and a signal from a second RFID tag responsive to the first waveform, wherein the first and second RFID tags each include an antenna, and wherein the first RFID tag antenna is randomly disposed in a different orientation than the second RFID tag antenna, and wherein a polarization angle of the antenna of the first RFID tag aligns with a polarization angle of the first antenna and the first antenna receives a stronger signal responsive to the first waveform from the first RFID tag than from the second RFID tag;

receiving, at the second antenna of the RFID reader while the RFID reader is transmitting the second waveform and simultaneously with receiving the response signals at the first antenna, response signals that collide at the time slot from the two or more RFID tags of the multiple RFID tags, the multiple signals received at the second antenna including a signal from the first RFID tag responsive to the second waveform and a signal from the second RFID tag responsive to the second waveform, wherein a polarization angle of the antenna of the second RFID tag aligns with a polarization angle of the second antenna and the second antenna receives a stronger signal responsive to the second waveform from the second RFID tag than from the first RFID tag, and wherein the response signals received at the first antenna and the response signals received at the second antenna collide at the time slot;

isolating, by a first receiver of the RFID reader, the signal from the first RFID tag from the signal from the second RFID tag based at least in part upon orthogonality of the different orientations of the first and second RFID tags and the orthogonality of the first and second waveforms;

isolating, by a second receiver of the RFID reader, the signal from the second RFID tag from the signal from the first RFID tag based at least in part upon orthogonality of the different orientations of the first and second RFID tags and the orthogonality of the first and second waveforms; and decoding a message in the signal from the first RFID tag to recover an identification (ID) of the first RFID tag and a message in the signal from the second RFID tag to recover an ID of the second RFID tag, wherein the signals from the first RFID tag and the second RFID tag are received simultaneously.

2. The method of claim 1, wherein the isolating the signal from the first RFID tag from the signal from the second RFID tag comprises:

filtering weaker signals received at the first antenna to mitigate the signal collision and to retrieve message data in the multiple signals sent from the first RFID tag.

3. The method of claim 1, wherein the polarization angle of the first antenna and the polarization angle of the second antenna are orthogonal to each other.

4. The method of claim 1, further comprising:

analyzing different signal strengths of the multiple signals received at the first antenna and different signal strengths of the multiple signals received at the second antenna.

5. The method of claim 2, wherein the isolating the signal from the first RFID tag from the signal from the second RFID tag further comprises:

filtering the multiple signals received at the first antenna with a first matched filter unit, wherein the decoding the message in the signal from the first RFID tag includes converting filtered signals from the first matched filter unit into the ID of the fist RFID tag.

6. The method of claim 5, wherein the isolating the signal from the second RFID tag from the signal from the first RFID tag comprises:

filtering weaker signals received at the second antenna to mitigate the signal collision and to retrieve message data in the multiple signals sent from the second RFID tag.

7. The method of claim 6, wherein the isolating the signal from the second RFID tag from the signal from the first RFID tag further comprises:

filtering the multiple signals received at the second antenna with a second matched filter unit, wherein the decoding the message in the signal from the second RFID tag includes converting filtered signals from the second matched filter unit into the ID of the second RFID tag.

8. A system for isolating response signals from colliding response signals of multiple radio frequency identification (RFID) tags by a RFID reader, the system comprising:

an antenna system, of the RFID reader, having a first antenna and a second antenna, wherein the first antenna is orthogonal to the second antenna, and wherein the RFID reader is operable to transmit to the multiple RFID tags a first waveform from the first antenna and a second waveform from the second antenna, wherein the first waveform is orthogonal to the second waveform;

a first receiver, of the RFID reader, coupled to the first antenna and operable to receive response signals that collide at a time slot from two or more RFID tags of the multiple RFID tags while the RFID reader is transmitting the first waveform, wherein the multiple signals received at the first antenna include a signal from a first RFID tag responsive to the first waveform and a signal from a second RFID tag responsive to the first waveform, wherein the first and second RFID tags each include an antenna, wherein the first RFID tag antenna is randomly disposed in a different orientation than the second RFID tag antenna, wherein a polarization angle of the antenna of the first RFID tag aligns with a polarization angle of the first antenna and the first antenna receives a stronger signal responsive to the first waveform from the first RFID tag than from the second RFID tag, and wherein the first receiver is further operable to isolate the signal from the first RFID tag from the signal from the second RFID tag based at least in part upon orthogonality of the different orientations of the first and second RFID tags and the orthogonality of the first and second waveforms;

a second receiver, of the RFID reader, coupled to the second antenna and operable to receive response signals that collide at a time slot from the two or more RFID tags of the multiple RFID tags while the RFID reader is transmitting the second waveform and simultaneously with the first receiver receiving the response signals from the first antenna, wherein the multiple signals received at the second antenna include a signal from the first RFID tag responsive to the second waveform and a signal from the second RFID tag responsive to the second waveform, wherein a polarization angle of the antenna of the second RFID tag aligns with a polarization angle of the second antenna and the second antenna receives a stronger signal responsive to the second waveform from the second RFID tag than from the first RFID tag, wherein the response signals received at the first antenna and the response signals received at the second antenna collide at the time slot, and wherein the second receiver is further operable to isolate the signal from the second RFID tag from the signal from the first RFID tag based at least in part upon orthogonality of the different orientations of the first and second RFID tags and the orthogonality of the first and second waveforms; and a retrieving module that is coupled to first and second demodulators and that is operable to resolve the colliding signals and retrieve at least one message of the first RFID tag to recover an identification (ID) of the first RFID tag and the second RFID tag to recover an ID of the second RFID tag based on a first component of the response signals and a second component of the response signals, wherein the colliding signals from the first RFID tag and the second RFID tag are received simultaneously.

9. The system of claim 8, wherein the first receiver comprises the first demodulator that is coupled to the first antenna and is operable to extract, based on an analysis of signal strengths of the multiple colliding signals, the first component from said response signals, and wherein the second receiver comprises the second demodulator that is coupled to the second antenna and is operable to extract, based on the analysis of the signal strengths of the multiple colliding signals, the second component from said response signals.

10. The system of claim 8, wherein the polarization angle of the first antenna and the polarization angle of the second antenna are orthogonal to each other.

11. The system of claim 8, further comprising:
a first waveform generator, coupled to the first antenna through a first transmitter, operable to generate a first time domain waveform comprising the first waveform transmitted from the first antenna; and
a second waveform generator, coupled to the second antenna through a second transmitter, and operable to generate a second time domain waveform comprising the second waveform transmitted from the second antenna, wherein the signal received from the first RFID tag comprises a carrier signal modulated by said first time domain waveform and the signal received from the second RFID tag comprises a carrier signal modulated by said second time domain waveform.

12. The system of claim 8, further comprising:
a first matched filter unit coupled to the first receiver and configured to extract a first filtered signal from an output of the first receiver; and
a second matched filter unit coupled to the second receiver and configured to extract a second filtered signal from an output of the second receiver.

13. The system of claim 8, wherein the first antenna and the second antenna are spatially isolated.

14. The system of claim 8, wherein the first antenna and the second antenna are isolated by radiation isolation.

15. The system of claim 11, wherein the first time domain waveform is a first modified Hermite pulse and the second time domain waveform is a second modified Hermite pulse.

* * * * *